(12) United States Patent
Hoffmans et al.

(10) Patent No.: US 9,726,218 B2
(45) Date of Patent: Aug. 8, 2017

(54) CROSS-LINK ASSEMBLY FOR A DANGLING WORKTOOL FOR A MACHINE

(71) Applicant: Caterpillar Work Tools B.V., 's-Hertogenbosch (NL)

(72) Inventors: Paul Hoffmans, 's-Hertogenbosch (NL); Kees Van Hooft, 's-Hertogenbosch (NL)

(73) Assignee: Caterpillar Work Tools B.V., s-Hertogenbossch (NL)

( * ) Notice: Subject to any disclaimer, the term of this patent is extended or adjusted under 35 U.S.C. 154(b) by 225 days.

(21) Appl. No.: 14/408,908

(22) PCT Filed: Jun. 19, 2013

(86) PCT No.: PCT/EP2013/062749
§ 371 (c)(1),
(2) Date: Dec. 17, 2014

(87) PCT Pub. No.: WO2013/189986
PCT Pub. Date: Dec. 27, 2013

(65) Prior Publication Data
US 2015/0292551 A1    Oct. 15, 2015

(30) Foreign Application Priority Data

Jun. 21, 2012    (EP) ..................... 12173019

(51) Int. Cl.
*E02F 3/36*    (2006.01)
*F16C 11/10*    (2006.01)
(Continued)

(52) U.S. Cl.
CPC ............ *F16C 11/10* (2013.01); *A01G 23/006* (2013.01); *A01G 23/08* (2013.01); *B66C 1/44* (2013.01);
(Continued)

(58) Field of Classification Search
CPC .... A01G 23/003; A01G 23/006; A01G 23/08; E02F 3/3622; E02F 3/3663;
(Continued)

(56) References Cited

U.S. PATENT DOCUMENTS 3,781,056 A    12/1973    Ransford et al.
3,937,302 A *   2/1976    Palmcrantz ............... F16F 7/04
                                                         188/130
(Continued)

FOREIGN PATENT DOCUMENTS

CN    1178566    4/1998
EP    2113610 A1    11/2009
(Continued)

OTHER PUBLICATIONS

International Search Report dated Jul. 9, 2031, in PCT/EP2013/062749 (3 pages).
(Continued)

*Primary Examiner* — Robert Pezzuto (57) ABSTRACT

A cross-link assembly for a dangling worktool may include a frame configured to connect to a grapple, the frame having spaced apart arms; a pin movably engaged with the spaced apart arms, the pin having an abutment portion; and a lock member movably engaged with the frame. The lock member may be configured to engage with the abutment portion and have a lock portion configured to engage with a lock element provided on the grapple.

20 Claims, 5 Drawing Sheets

(51) Int. Cl.
  *A01G 23/00* (2006.01)
  *A01G 23/08* (2006.01)
  *B66C 3/00* (2006.01)
  *E02F 3/413* (2006.01)
  *E02F 9/00* (2006.01)
  *B66C 1/44* (2006.01)
  *B66C 13/00* (2006.01)

(52) U.S. Cl.
  CPC .............. *B66C 3/005* (2013.01); *B66C 13/00* (2013.01); *E02F 3/3645* (2013.01); *E02F 3/3677* (2013.01); *E02F 3/413* (2013.01); *E02F 9/006* (2013.01)

(58) Field of Classification Search
  CPC ....... E02F 3/3645; E02F 3/3677; E02F 3/413; E02F 9/006; B66C 1/06; B66C 1/588; B66C 3/005; B66C 3/04; B66C 3/16; B66C 3/20; B66C 1/44; B66C 13/00; F16F 7/02; F16F 7/04; F16C 11/10
  USPC ................... 37/403–410, 468; 172/272–274; 188/71.1, 83; 294/86.41, 106, 119.4; 414/606, 734, 735, 739
  See application file for complete search history.

(56) References Cited

U.S. PATENT DOCUMENTS

| | | | |
|---|---|---|---|
| 4,253,695 A | | 3/1981 | Blaive et al. |
| 4,715,641 A | * | 12/1987 | Palmer ............... F16F 7/02 188/71.1 |
| 5,142,992 A | | 9/1992 | Long, Jr. |
| 5,601,161 A | * | 2/1997 | Brigden ............ B66C 3/005 188/83 |
| 5,727,342 A | | 3/1998 | Horton |
| 6,168,219 B1 | * | 1/2001 | Futa .................. B66C 1/06 294/106 |
| 6,230,740 B1 | | 5/2001 | Horton et al. |
| 6,315,344 B1 | * | 11/2001 | Mattson ............ A01G 23/003 294/86.41 |
| 7,690,880 B2 | | 4/2010 | Honeyman et al. |
| 2004/0004362 A1 | * | 1/2004 | Love ................. B66C 3/04 294/3 |
| 2007/0028488 A1 | | 2/2007 | Bilinsky et al. |
| 2007/0189846 A1 | | 8/2007 | Cocayne |
| 2009/0269133 A1 | | 10/2009 | Van Amelsfoort et al. |

FOREIGN PATENT DOCUMENTS

| | | |
|---|---|---|
| GB | 18401 | 0/1909 |
| WO | WO 00/53522 A1 | 9/2000 |
| WO | WO 2009/151365 A1 | 12/2009 |

OTHER PUBLICATIONS

European Search Report dated Nov. 20, 2012, in European Application EP/12173019 (2 pages).

* cited by examiner

CROSS-LINK ASSEMBLY FOR A DANGLING WORKTOOL FOR A MACHINE

CLAIM FOR PRIORITY

This application is a U.S. National Phase entry under 35 U.S.C. §371 from PCT International Application No. PCT/EP2013/062749, filed Jun. 19, 2013, which claims benefit of priority of European Patent Application No. 12173019.6, filed Jun. 21, 2012, all of which are incorporated herein by reference.

TECHNICAL FIELD

This disclosure relates to cross-links, particularly to cross-links of dangling grapplers and cross-links of multi-processor jawsets. This disclosure relates more particularly to lock mechanisms for the cross-links of dangling grapplers and cross-links of multi-processor jawsets.

BACKGROUND

Dangling grapples, like scrapgrapples, orange peel grapples, clamshell grapples, logging grapples and the like, may be connected to movable arm of work machines such as material handling machines, tractors, excavators or material handling equipment. The grapple may be connected to the movable arm through a cross-link group, also known in the art as a crosshead. A cross-link group may thus carry the grapple weight and the load generated by the payload.

A cross-link group may be provided with a main pin extending through parallel bushings to facilitate mounting and dismounting of a grapple from the arm of a work machine. When a grapple is in a rest position, for instance lowered to the ground, the grapple may be decoupled from the machine arm.

In certain work machines the grapple may be coupled or decoupled to the machine arm through the insertion and extraction of the main pin relative to the cross-link group. In other work machines the grapple may be coupled or decoupled through a quick release autoconnect system that allows for a relatively easy exchange of the grapple whereby the operator may connect or change a work tool without leaving the cab. The machine mounting bracket is arranged to slide into the work tool mounting bracket, when the work tool is positioned on the ground.

In general coupling or decoupling a dangling grapple from the machine arm may be difficult as the cross-link frame may fall onto one side when not connected to the machine arm. Reconnecting the grapple to the machine arm may be possible when the cross-link frame is maintained in the upright position relative to the machine arm.

With a quick release autoconnect system the ability to retain the cross-link frame in the upright position becomes even more important as the operator does not leave the cab of the machine.

The present disclosure is directed, at least in part, to improving or overcoming one or more aspects of the prior art system.

BRIEF SUMMARY OF THE INVENTION

In a first aspect, the present disclosure describes a cross-link assembly comprising a frame for connection to a dangling worktool, the frame having spaced apart arms; a pin movably engaged to the spaced apart arms, the pin being provided with an abutment portion; a lock member movably engaged to the frame, the lock member being configured to engage with the abutment portion and having a lock portion configured to engage with a lock element provided on the grapple.

In a second aspect, the present disclosure describes a method of maintaining alignment of a cross-link assembly and a dangling worktool. The method may comprise the steps of aligning a longitudinal axis of a frame of the cross-link assembly and a longitudinal axis of the grapple head assembly connected to the grapple. The frame having spaced apart arms. Rotating the pin movably engaged to the spaced apart arms.

The pin may be provided with an abutment portion configured to engage with a lock member so as to translate the lock member movably engaged to the frame and having a lock portion configured to engage with a lock element provided on the grapple.

The pin may be provided with an abutment portion, such as a cam, to engage with an abutment follower, such as a cam follower, provided on a lock member so as to translate the lock member movably engaged to the frame and having a lock portion configured to engage with a lock element provided on the grapple.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a cross-link assembly 10 for a dangling worktool 56. The dangling worktool may be a grapple, a dangling grapple or a pincer. The cross-link assembly 10 may be connected to the grapple 56.

Figure 1:
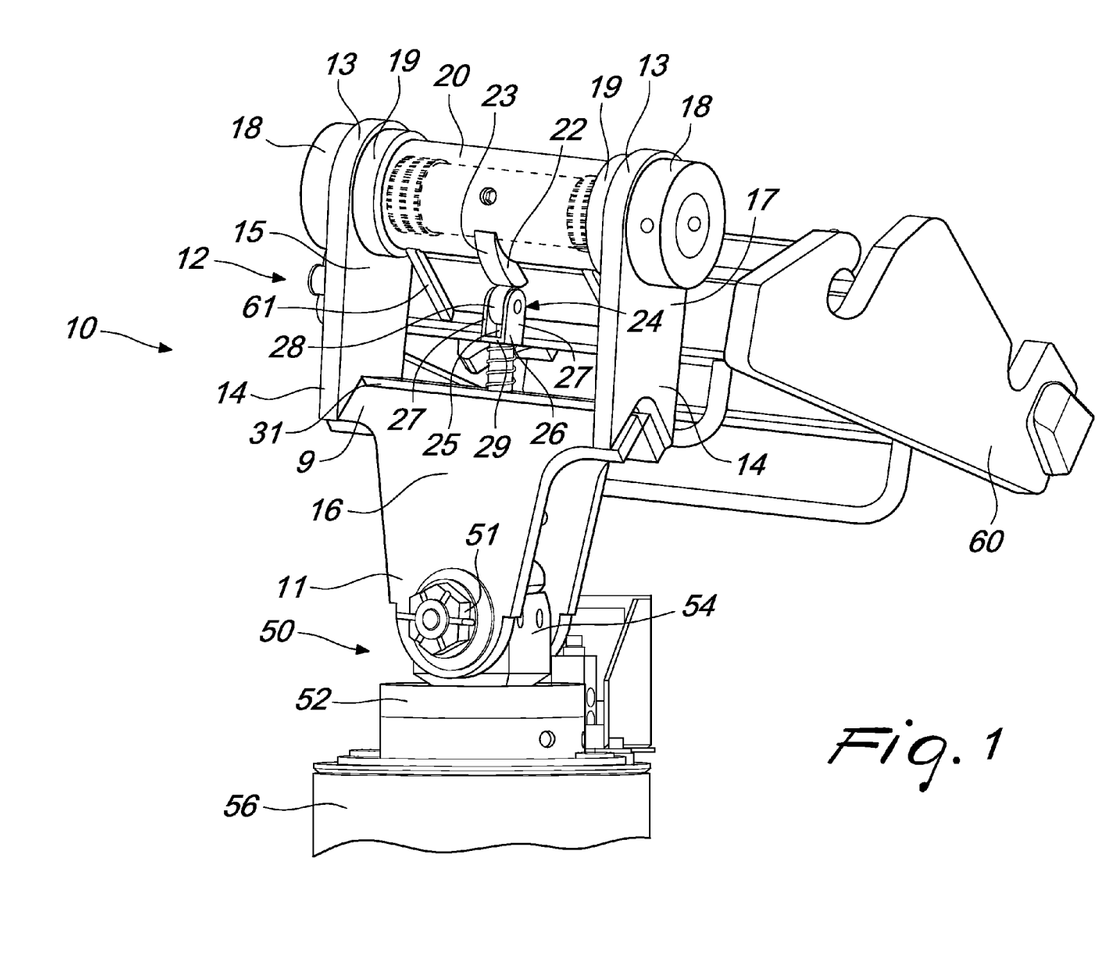
FIG. 1 is an isometric view of a cross-link assembly in a locked configuration according to the present disclosure.

FIG. 1 illustrates a cross-link assembly 10 in a locked configuration. The cross-link assembly 10 may be locked relative to the grapple 56. In the locked configuration the cross-link assembly 10 may not be movable relative to the grapple 56.

The cross-link assembly 10 may comprise a frame 12. The frame 12 may have spaced apart arms 14. The arms 14 may be mutually parallel. A side of an arm 14 may face the corresponding side of the opposite arm 14. These sides of arms 14 are hereinafter referred to as inner sides 15 and, accordingly, the opposite side of each inner side 15 of an arm 14 is hereinafter referred to as outer side 17.

Each arm 14 may have a free end 13. The free end 13 of each arm 14 may have a through hole. Each through hole may extend through each arm 14 with openings on the inner side 15 and outer side 17 of each arm 14. The through holes of each arm 14 may be substantially mutually aligned. In an embodiment, the through holes may be threaded.

On outer side 17 of each arm 14, an outer collar 18 may circumvent the opening of the through hole. An inner collar 19 may circumvent the opening of the through hole on the inner side 15 of each arm 14.

In an embodiment, outer collars 18 and inner collars 19 may assist in extending the through holes such that the openings of collars 18, 19 may operate as openings for the through holes.

The frame 12 may be configured for connection of the cross-link assembly 10 to the grapple 56. The end of each arm 14 may be connected to a pair of flanges 16. Each arm 14 may be upright relative to mounting portions 9 of the flanges 16 that are connected to the arms 14.

Opposite the mounting portions 9 of the flanges 16 there may be connecting portions 11. The connecting portions 11 may be configured for receiving and connecting to a coupling member 54. The connecting portions 11 may be spaced apart for receiving the coupling member 54. In an embodiment, the connecting portions 11 may be mutually parallel.

The flanges 16 may be connected to the coupling member 54. The flanges 16 may be connected to the coupling member 54 through a connector 51 such as a pin or a threaded screw.

Each flange 16 may have a guide hole. The guide holes may be disposed at the connecting portions 11. The coupling member 54 may be engaged to the flanges 16 by initially aligning the guide holes in the flanges 16 to a corresponding hole in the coupling member 54 and inserting the connector 51 through the guide holes and the corresponding hole in the coupling member 54.

The cross-link assembly 10 may have a longitudinal axis extending though the frame 12 between the arms 14 and from the mounting portions 9 to the connecting portions 11 of the flanges 16.

The cross-link assembly 10 may comprise a pin 20. The pin 20 may be configured for the connection of the cross-link assembly 10 to an arm of a machine. The frame 12 may be suitably configured for the pin 20 to be rotatably supported by the arms 14.

The pin 20 may be carried in the frame 12 by the arms 14. The pin 20 may be supported in the frame 12 between the arms 14. The pin 20 may be movably engaged to the arms 14. The pin 20 may be rotatable relative to the arms 14. The pin 20 may be rotatably supported in the through holes in the arms 14 at ends 13. The pin 20 may be rotatably supported by the inner collars 19. The pin 20 may be further rotatably supported by the outer collars 18.

The rotation of the pin 20 may be limited by stop limits. Stop limits may be positioned on the surface of the pin 20. Stop limits may interact with the arms 14.

In an embodiment, the pin 20 may be insertable through the collars 18, 19 and the through holes in the arms 14 at ends 13. After insertion, the pin 20 may be rotatably supported by the arms 14.

The pin 20 may be formed as a cylinder. In an embodiment the pin 20 may be a sticknose.

The pin 20 may be configured to engage with a lock member 30 such that the movement of the pin 20 effects a translation movement of the lock member 30. The pin 20 may have an abutment portion 22 to engage the lock member 30 so that the abutment portion 22 engages the lock member 30 when the pin 20 is moved. The abutment portion 22 may be a suitably shaped protrusion or a structure provided on the pin 20.

The abutment portion 22 may be moved relative to the arms 14 through movement of the pin 20. The abutment portion 22 may engage with the lock member 30 through the movement of the pin 20.

The pin 20 may be configured to engage with a lock member 30 such that the rotation of the pin 20 effects a translation movement of the lock member 30. The pin 20 may be rotated about a rotation axis A. The rotation axis A may be coincident with the longitudinal axis of the pin 20.

In an embodiment, a translation of the pin 20 in a direction along the longitudinal axis thereof may effect a translation movement of the lock member 30. In an embodiment, the translation of the lock member 30 may be effected through sequential translation and rotation of the pin 20.

The abutment portion 22 may be disposed on a surface of the pin 20 that extends substantially perpendicular to the arms 14. The abutment portion 22 may be disposed centrally on the pin 20. The abutment portion 22 may protrude from the surface of the pin 20 in a direction substantially perpendicular to the longitudinal axis of the pin 20. The abutment portion 22 may protrude from the surface of the pin 20 in a direction substantially parallel to the arms 14. The pin 20 may protrude from the surface of the pin 20 in a direction substantially parallel to the inner side 15 and outer side 17 of each arm 14. In an embodiment the abutment portion 22 may be arcuate.

In an embodiment, the abutment portion 22 may be a cam.

Abutment portion 22 may be rotated relative to the arms 14 through rotation of the pin 20. The abutment portion 22 may engage with the lock member 30 through the rotation of the pin 20. Rotation of the pin 20 may move the abutment portion 22 into engagement with the lock member 30 for the translation thereof.

Abutment portion 22 may have an abutment surface 23 for engaging the lock member 30. The abutment surface 23 may be opposite the surface disposed on the pin 20.

In an embodiment, the abutment surface 23 may be a cam surface.

In an embodiment the abutment surface 23 may be arcuate. The abutment surface 23 may vary in curvature along the length of the abutment portion 22. The abutment surface 23 may vary in curvature along the longitudinal axis of the abutment portion 22.

The height of the abutment portion 22 may vary along the length. The distance of abutment surface 23 from the pin 20 may vary along the longitudinal axis of the abutment portion 22.

The abutment surface 23 may be varyingly spaced from the surface of the pin from an end to the opposite end.

At an end of pin 20, the distance of the abutment surface 23 from the pin 20 may be at the lowest relative to the other portions of the abutment portion 22. The abutment surface 23 may be contiguous with a surface of the pin 20. The abutment surface 23 may be flush with a surface of the pin 20.

At an opposite end, the distance of abutment surface 23 from the pin 20 may be at the greatest relative to the other portions of the abutment portion 22. The abutment surface 23 may extend between the end at which the abutment surface 23 is contiguous with the pin 20 to the spaced end at which the abutment surface 23 has the greatest distance from the pin 20.

In an embodiment, the pin 20 may be connected to an autoconnect bracket 60 of the grapple. The autoconnect bracket 60 may be connectable to corresponding autoconnect mounting bracket 62 of a machine. The autoconnect bracket 60 may be rigidly connected to the pin 20 by a link element 61. The link element 61 may be a rigid block composed of suitable materials. The autoconnect bracket 60 may be connected to the pin 20 such that rotation of the link element 61 effects a rotation of the pin 20. The link element 61 may rotate about the rotation axis A of the pin 20.

An end of the abutment portion may be joined to the link element 61. In an embodiment, an end of the abutment portion 22 may be joined to the link element 61. The end of the abutment portion 22 at which the abutment surface 23 has the greatest distance from the pin 20 may be joined to the link element 61. The abutment surface 23 may terminate at the joint between the abutment portion 22 and the link element 61.

Figure 2:
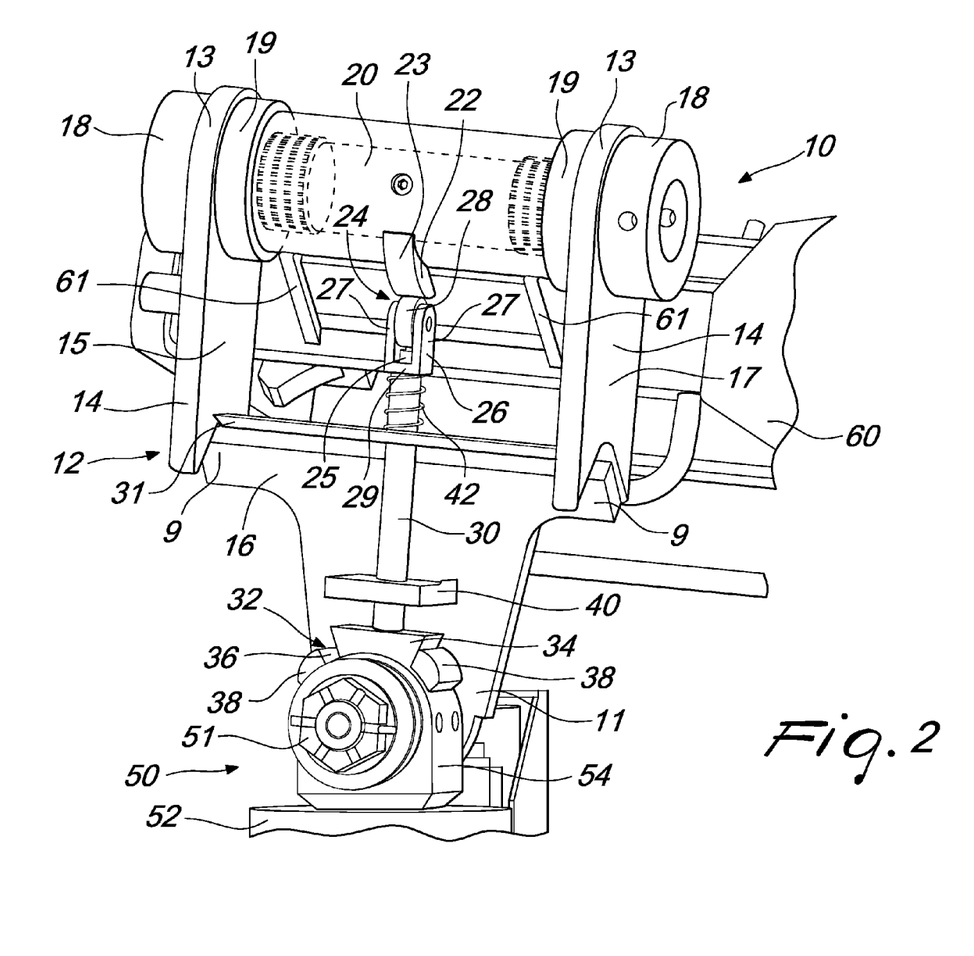
FIG. 2 is an isometric view of the cross-link assembly of FIG. 1 with a portion removed to show the further elements.

FIG. 2 illustrates a cross-link assembly 10 in a locked configuration with a flange 16 removed. The lock member 30 may be movably engaged to the frame 12.

The lock member 30 may be translatable relative to the frame 12. The lock member 30 may be translatable between a lock position and an unlock position. The lock position and the unlock position represent the limits of the translation path of the lock member 30. In the lock position the lock member 30 may be engaged to a lock element 32. In the unlock position the lock member 30 may not be engaged to the lock member 32.

The lock member 30 may be translatable relative to the flanges 16. The lock member 30 may be disposed between flanges 16. The lock member 30 may be centrally disposed relative to each flange 16. The lock member 30 may be positioned between arms 14 and equidistant from each arm 14.

The frame 12 may comprise a support member 31 to support the lock member 30 movably within the frame 12. The support member 31 may be disposed transverse to the longitudinal axis of the frame 12.

The support member 31 may extend between the arms 14. The support member 31 may be connected to the arms 14. The support member 31 may be connected to the flanges 16. The support member 31 may be disposed transverse to the longitudinal axis of the arms 14.

The support member 31 may be shaped so as to be mounted between the mounting portions 9 of the flanges 16. The mounting portions 9 may be correspondingly shaped to receive and to be connected to the support member 31.

The support member 31 may have an orifice through which the lock member 30 may extend. The lock member 30 may be translatable relative to the support member 31.

The support member 31 may be a rod or a beam made of suitable materials.

In an embodiment, the lock member 30 may be supported in the frame 12 by the flanges 16. The flanges 16 may be configured to support the lock member 30 movably within the frame 12.

At an end the lock member 30 may be configured to engage the pin 20 such that the movement of the pin 20 effects a translation movement of the lock member 30 relative to the frame 12 and the pin 20. The lock member 30 may be configured to engage an abutment portion of the pin 20 so that when the pin 20 is moved the abutment portion of the pin 20 engages the lock member 30. The abutment portion may be a suitably shaped protrusion or a structure provided on the pin 20.

The lock member 30 may be configured to engage with the pin 20 such that the rotation of the pin 20 effects a translation movement of the lock member 30. In an embodiment, lock member 30 may be configured to engage with the pin 20 such that a translation of the pin 20 in a direction along the direction of the longitudinal axis thereof effects a translation movement of the lock member 30. In an embodiment, the lock member 30 may be configured to engage with the pin 20 such that a sequential translation and rotation of the pin 20 effects translation movement of the lock member 30.

The engagement of the lock member 30 with the abutment portion may effect a translation of the lock member 30 in a linear direction from the unlock position towards the lock position. The translation movement of the lock member 30 may be in a linear direction away from the pin 20.

The lock member 30 may have an abutment follower to engage the abutment portion of the pin 20.

In an embodiment, the lock member 30 may be configured to engage the abutment portion 22 provided on the pin 20 such that the rotation of the pin 20 effects a translation movement of the lock member 30 relative to the frame 12 and the pin 20.

The lock member 30 may have an abutment follower 24 to engage the abutment portion 22. The lock member 30 may have an abutment follower 24 to engage the abutment surface 23. The abutment follower 24 may engage the surface of the pin 20 from which the abutment portion 22 extends. The abutment follower 24 may engage sequentially the abutment surface 23 and the surface of the pin 20 from which the abutment portion 22 extends.

In an embodiment, the abutment follower 24 may be a cam follower.

The abutment follower 24 may be disposed at the end of the lock member 30 configured for engagement to the pin 20. The abutment follower 24 may be disposed at an end opposite the end of the lock member 30 configured to engage with the lock element 32. The abutment follower 24 may extend from the lock member 30 in a direction aligned to the longitudinal axis of the lock member 30.

The abutment follower 24 may comprise a roller 28 to engage the abutment portion 22 or the surface of the pin 20. The roller 28 may be rotatably carried by the lock member 30. The roller 28 may engage the abutment surface 23 and the surface of pin 20 through a rolling action.

In an embodiment, the roller 28 may be rotatably connected directly to the lock member 30. The roller 28 may be rotatably connected by a pin which is inserted through the roller 28 and the lock member 30.

The roller 28 may be rotatably connected to the lock member 30 through a holder 26. The holder 26 may be rigidly connected to the lock member 30 and the roller 28 may be rotatably connected to the holder 26. The roller 28 may be rotatably connected by a pin which is inserted through the roller 28 and the holder 26.

The holder 26 may comprise a substantially U-shaped structure having a central void 25. The roller 28 may be held in the central void 25. The roller 28 may be held in position between the two legs 27 of the holder 26 that border the central void 25. The two legs 27 are connected through a cross beam 29 that borders the central void 25. The cross beam 29 may be transverse to the two legs 27. The roller 28 may be connected to the holder 26 at the ends of the legs 27 opposite the ends connected to the cross beam 29. The cross beam 29 may be rigidly connected to the lock member 30 such that there is no relative movement between the holder 26 and the lock member 30.

In an embodiment, the holder 26 may comprise of a single leg 27 connected to the cross beam 29. The roller 28 may be held in position by the leg 27.

The lock member 30 may be biasingly coupled to the frame 12 such that the abutment follower 24 is biased towards the pin 20. The abutment follower 24 may be held in biasing engagement with the surface of the pin 20 or the abutment surface 23.

A biasing element 42 may be interposed between the abutment follower 24 and the frame 12. The biasing element 42 may be disposed between the cross beam 29 and the support member 31. In an embodiment, the biasing element 42 may be disposed between cross beam 29 and the mounting portions 9 of the flanges 16.

In an embodiment, the biasing element 42 may be interposed between a limit body positioned on the lock member 30 adjacent the abutment follower 24 and either the cross beam 29 or the mounting portions 9 of the flanges 16. The limit body may be a protrusion of the lock member 30 or a structure positioned on the lock member 30.

The biasing element 42 may urge the lock member 30 to translate in a linear direction from the lock position towards the unlock position. The lock member 30 may translate in a linear direction towards the pin 20.

The biasing element 42 may be a spring. The spring may be positioned around the lock member 30.

The lock member 30 may have a lock portion 34 at an end opposite the end connected to the abutment follower. The lock member 30 may have a lock portion 34 at an end opposite the end connected to the abutment follower 24. The lock portion 34 may enable the lock member 30 to engage with the lock element 32. The lock portion 34 may have a shape or a dimension to lock with the lock element 32 having a corresponding shape or dimension.

In the lock position of the lock member 30 the lock portion 34 may be engaged to a lock element 32. The abutment follower 24 may be in engagement with the abutment surface 23. In the unlock position of the lock member 30 the lock portion 34 may not be engaged to the lock member 30. The abutment follower 24 may be in engagement with the surface of the pin 20.

The lock portion 34 may project from the lock element 32 in a direction away from the abutment follower or the abutment follower 24. The lock portion 34 may have a projection that engages with a corresponding lock element 32. The lock portion 34 may have a trapezoidal shape.

In an embodiment, the lock portion 34 may have an indentation that engages with a corresponding lock element 32. The lock element 32 may be a boss for engaging into the indentation.

The cross-link assembly 10 may further comprise a stop member 40 to abut the lock portion 34 so as to limit the movement of the lock member 30. The stop member 40 may limit the movement of the lock member 30 when the lock member 30 translates from the lock position to the unlock position.

In an embodiment, the distance traveled by the lock portion 34 from the locking engagement with the lock element 32 to the abutting engagement with the stop member 40 may be equal to the distance of the abutment surface 23 from the surface of the pin 20 at the end joined to the link element 61.

The stop member 40 may be positioned between the flanges 16. The stop member 40 may be a plate having an aperture through which the lock member 30 may be disposed. The lock member 30 may be translatable through the stop member 40.

The lock element 32 may be provided on a grapple head assembly 50. The coupling member 54 may be rigidly connected to the grapple head assembly 50. The grapple head assembly 50 may be rigidly connected to the grapple 56 at a position adapted for the connection of the grapple head assembly 50.

The lock element 32 may have a shape or a dimension to lock with the lock portion 34 having a corresponding shape or dimension. The lock element 32 may have a slot 36 that is formed by a pair of bosses 38. The slot 36 may receive the lock portion 34 projecting from the lock member 30. The lock portion 34 may be retained in the slot 36 by the bosses 38. The slot 36 may be dimensioned to be wider than the width of the lock member 30. The difference in dimension may allow any potential misalignment between disconnected grapple 56 and the arm of the machine.

In an embodiment, the lock element 32 may comprise a single boss to be received in the indentation formed in the lock portion 34. The single boss may be retained in the indentation formed in the lock portion 34.

The lock portion 34 and the lock element 32 may be pushed into engagement by the engagement of the lock member 30 and the abutment portion formed on the pin 20. The lock portion 34 and the lock element 32 may be held in engagement while the lock member 30 is engaged with the abutment portion of the pin 20. Relative transverse movement between the lock portion 34 and the lock element 32 may be prevented by the mutual engagement.

The cross-link assembly 10 may be maintained in alignment relative to the grapple 56 by the engagement of the lock member 30 and the lock element 32 in the lock position of the lock member 30. The cross-link assembly 10 may be maintained in vertical alignment relative to the grapple head assembly 50 by the engagement of the lock member 30 and the lock element 32 in the lock position of the lock member 30. The cross-link assembly 10 may be aligned to the grapple 56 when the cross-link assembly 10 is vertically aligned to the grapple head assembly 50.

The term vertical alignment may be defined by the mutual relative positions of the grapple head assembly 50 and the cross-link assembly 10 at the moment of operational coupling of the grapple 56 to the arm of the machine. The cross-link assembly 10 may be positioned above the grapple head assembly 50 and the grapple so as to be available for coupling to the machine arm through the cross-link assembly 10. The cross-link assembly 10 may be upright relative to the arm of the machine.

Figure 3:
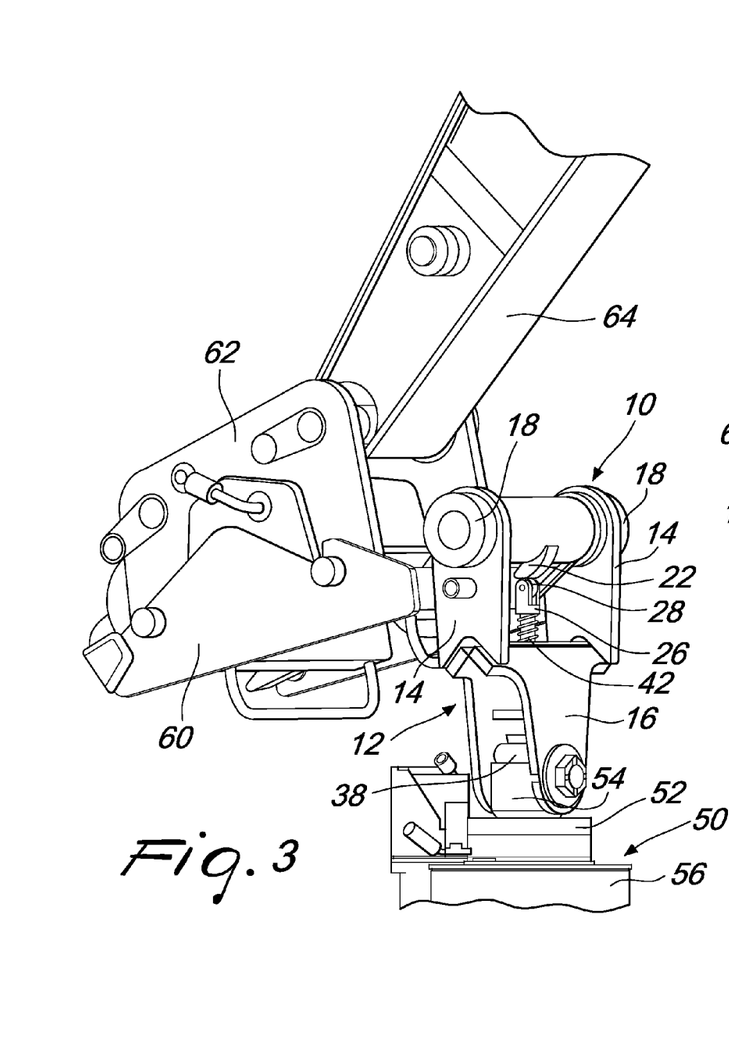
FIG. 3 is an isometric view of the cross-link assembly of FIG. 1 having an autoconnect bracket engaged to an autoconnect bracket of a machine arm.

With reference to FIG. 3 the cross-link assembly 10 may be in alignment to the grapple 56. The cross-link assembly 10 may be in vertical alignment to the grapple head assembly 50. In an embodiment, the longitudinal axis of the cross-link assembly 10 may be parallel to the longitudinal axis of the grapple 56. In an embodiment, the longitudinal axis of the cross-link assembly 10 may be parallel to the longitudinal axis of the grapple head assembly 50. In an embodiment, the longitudinal axes of the cross-link assembly 10 and the grapple head assembly 50 may be coaxial.

The machine arm 64 may be coupled with the grapple 56. The machine autoconnect bracket 62 may be coupled to the autoconnect bracket 60 of the grapple 56. The pin 20 may be rotated such that the abutment portion engages with the abutment follower of the lock member 30. In an embodiment, the abutment follower may be the abutment follower 24 which engages with the abutment portion 22. The abutment follower 24 may be positioned at the end of the abutment surface 23 and in abutting engagement with the link element 61. The lock member 30 may be in the lock position and in engagement with the lock element 32 provided on the grapple head assembly 50.

Figure 4:
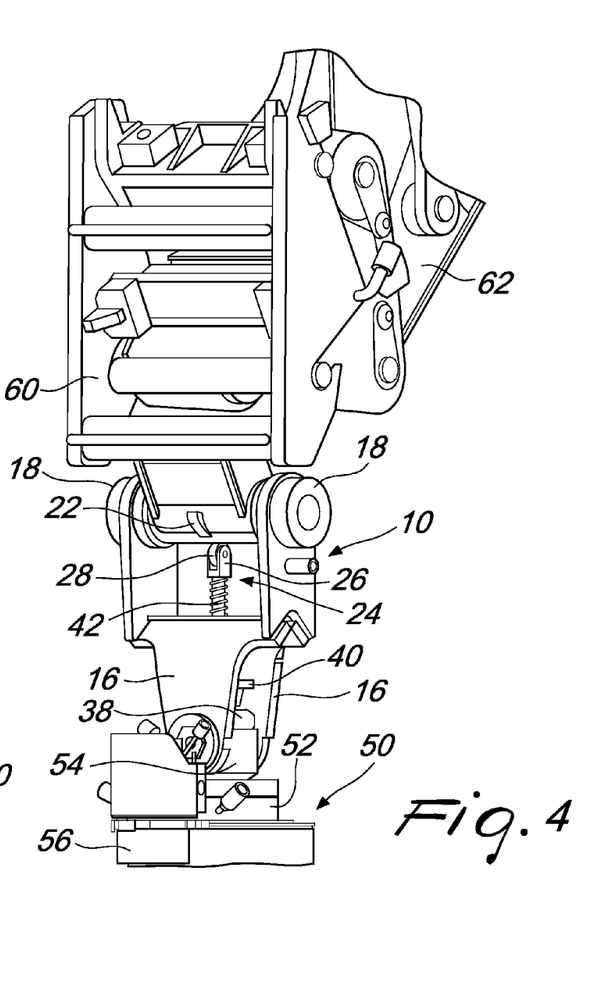
FIG. 4 is an isometric view of a cross-link assembly in an unlocked configuration according to the present disclosure.

With reference to FIG. 4, the machine arm 64 may be moved to a working position In the working position the dangling worktool 56 may be engaged to the machine arm 64 and ready for operation. The movement of the machine arm 64 may effect a rotation of the link element 61 about the rotation axis A of the pin 20. The rotation of the link element 61 may cause a corresponding rotation of the pin 20.

As pin 20 rotates the abutment follower of the lock member 30 may move across a surface of the abutment portion of the pin 20. In an embodiment, the abutment follower 24 may move along the abutment surface 23 of the abutment portion 22. The biasing element 42 may urge the lock member 30 towards the pin 20 and effect the translation of the lock member 30 from lock position to the unlock position as the abutment follower 24 travels along the surface of the abutment surface 23 through the rotation of the pin 20.

As the abutment follower 24 moves away from the end of the abutment surface 23 adjoined to the link element 61 the lock portion 34 may continue to move out of engagement with the lock element 32.

The lock member 30 may move out of engagement with the lock element 32. The lock portion 34 may disengage with the lock element 32. The lock portion 34 may be disengaged from the lock element 32 when the abutment follower 24 is at the end of the abutment surface 23 contiguous with the surface of the pin 20 or when the abutment follower 24 is in engagement with the surface of the pin 20.

In an embodiment, the rotation of pin 20 may be limited by a stop limit. The stop limit may be positioned such that the further rotation of pin 20 is stopped after lock portion 34 is disengaged from the lock element 32. The stop limit may be positioned such that the rotation of the pin 20 may be stopped after a rotation of 320°. The stop limit may be positioned such that the rotation of the pin 20 may be stopped after a rotation before the abutment follower 24 reaches the spaced end of the abutment portion 22.

Figure 5:
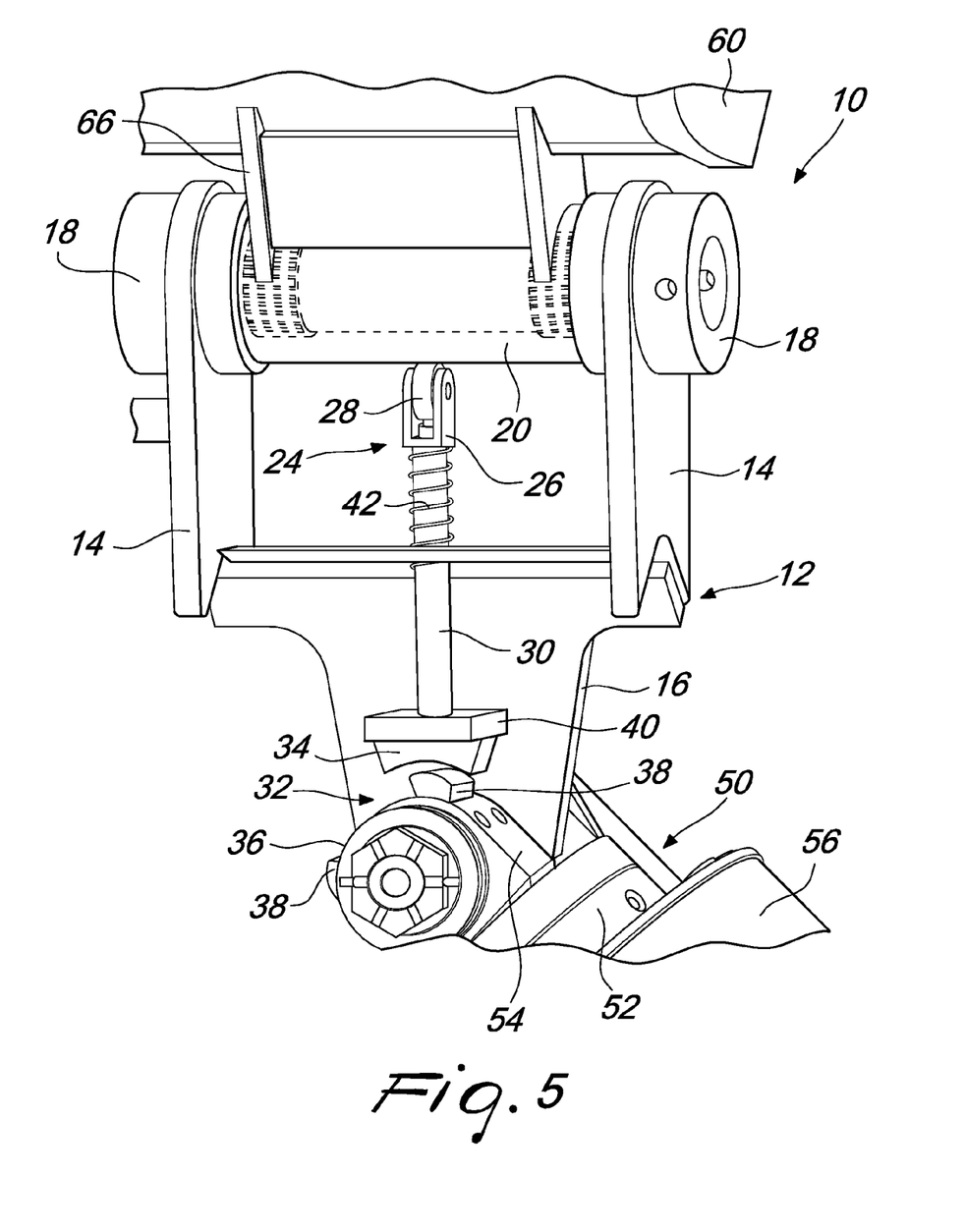
FIG. 5 is an isometric view of the cross-link assembly of FIG. 4 with a portion removed to show further elements.
Figure 6:
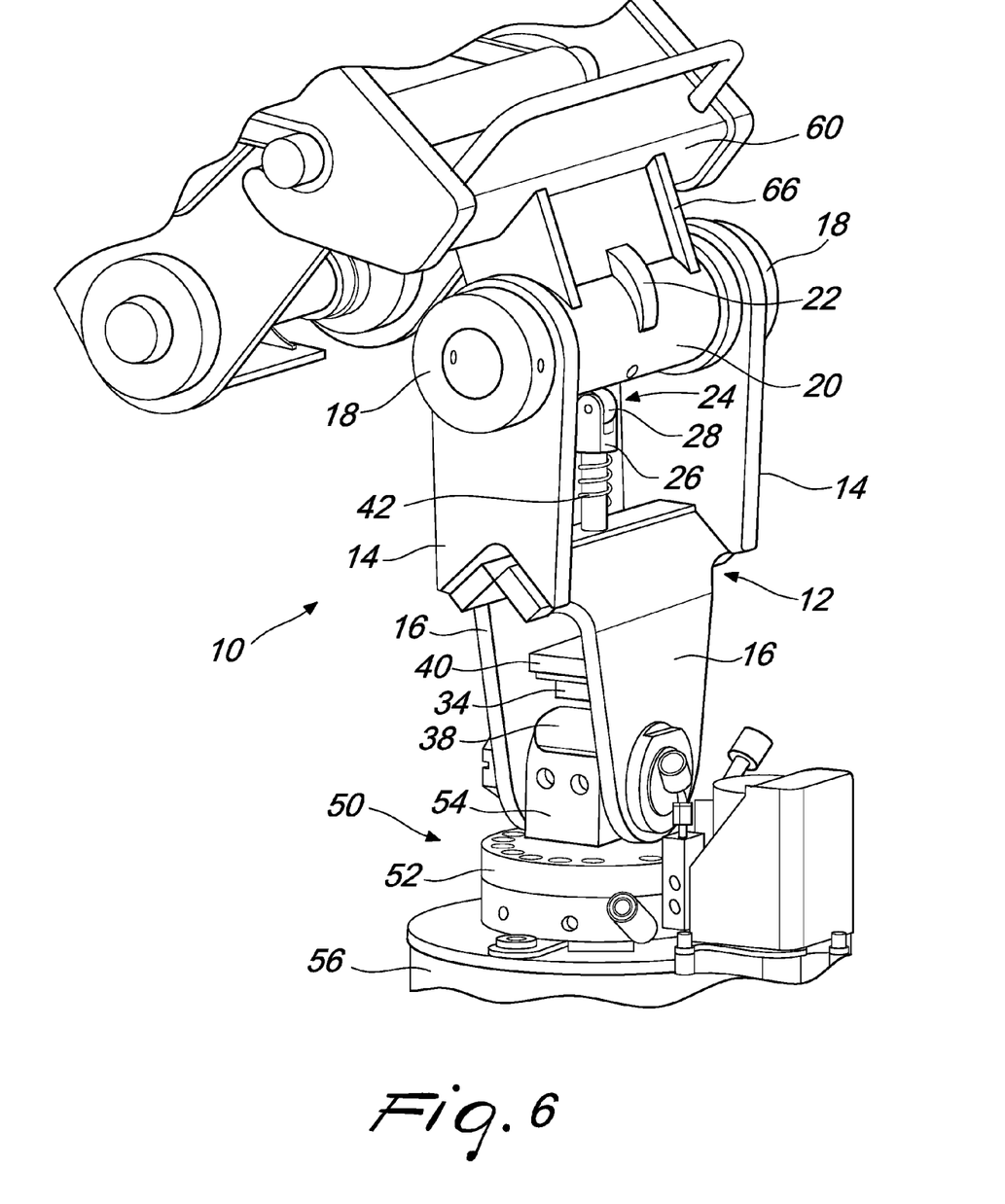
FIG. 6 is an isometric view of the cross-link assembly in an unlocked configuration according to the present disclosure.

With reference to FIGS. 5 and 6, the lock member 30 may be in the unlock position and the lock portion 34 may be disengaged from the lock element 32. The translation of the lock member 30 may move the lock portion 34 into abutting engagement with the stop member 40.

With the lock element 32 disengaged from the lock portion 34 the grapple 56 may be free to move relative to the cross-link assembly 10. The grapple 56 and the grapple head assembly 50 may rotate relative to the cross-link assembly 10. The longitudinal axis of the cross-link assembly 10 may incline relative to the longitudinal axis of the grapple head assembly 50.

A method of maintaining alignment of a cross-link assembly 10 and a grapple 56 may comprise the steps of aligning a longitudinal axis of a frame 12 of the cross-link assembly 10 and a longitudinal axis of the grapple head assembly 50 connected to the grapple 56. The frame 12 having spaced apart arms 14. Rotating the pin 20 movably engaged to the spaced apart arms 14. The pin 20 being provided with the abutment portion 22 to engage with the abutment follower 24 provided on a lock member 30 so as to translate the lock member 30 movably engaged to the frame 12 and having a lock portion 34 configured to engage with a lock element 32 provided on the grapple 56.

The method may comprise rotating an autoconnect bracket 60 connected to the pin 20 for rotation of the pin 20.

The skilled person would appreciate that foregoing embodiments may be modified or combined to obtain the cross-link assembly 10 of the present disclosure.

INDUSTRIAL APPLICABILITY

This disclosure describes a cross-link assembly 10 for a grapple. The cross-link assembly 10 may not fall to a side over during or after decoupling of the machine arm from grapple. In the lock position of the lock member 30 the cross-link assembly 10 may be maintained in a vertically aligned position relative to the grapple.

The cross-link assembly 10 may be in the lock position when the grapple is not in use and may be in the unlock position when the grapple is in operation so as to allow relative movement between the cross-link assembly 10 and the grapple. The cross-link assembly 10 may be locked relative to the grapple when moved into the non-working or decoupling position. The cross-link assembly 10 may be unlocked relative to the grapple when moved into the working position.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The disclosures in European Patent Application No. 12173019.6 from which this application claims priority are incorporated herein by reference.

The invention claimed is:

1. A cross-link assembly for a dangling worktool, the cross-link assembly comprising:
   a frame configured to connect to a grapple, the frame having spaced apart arms;
   a pin movably engaged with the spaced apart arms, the pin having an abutment portion, the pin being rotatable relative to the spaced apart arms about a pin rotational axis; and
   a lock member movably engaged with the frame,
   a first portion of the lock member being operatively engaged with the abutment portion of the pin such that rotation of the abutment portion about the pin rotational axis varies a distance from the first portion of the lock member to the pin rotational axis,
   the lock member having a lock portion that is configured to engage with a lock element provided on the grapple.

2. The cross-link assembly of claim 1, wherein the first portion of the lock member is an abutment follower, the lock member being biasingly engaged with the frame such that the abutment follower is biased toward the pin.

3. The cross-link assembly of claim 2, wherein a biasing element is interposed between the abutment follower and the frame.

4. The cross-link assembly of claim 1, wherein the abutment portion is a cam, and
the first portion of the lock member is a cam follower.

5. The cross-link assembly of claim 4, wherein the abutment follower comprises a roller held in position by a holder rigidly connected to the lock member.

6. The cross-link assembly of claim 4, wherein the abutment portion projects from the pin along a radial direction and has a surface with an arcuate shape, the radial direction being perpendicular to the pin rotational axis, and
a distance from the surface of the abutment portion to the pin rotational axis varies with a circumferential direction about the pin rotational axis.

7. The cross-link assembly of claim 6, wherein the abutment portion has an end that is contiguous with a surface of the pin for transition of the abutment follower between the abutment portion and an adjoining surface of the pin.

8. The cross-link assembly of claim 1, wherein the lock member is translatable relative to the frame between a lock position and an unlock position.

9. The cross-link assembly of claim 1, wherein the lock portion is configured to engage with the lock element, the lock element including a slot and a pair of bosses for receiving the lock portion.

10. The cross-link assembly of claim 1, wherein the lock element includes a boss, and
the lock portion comprises an indentation to engage with the boss.

11. The cross-link assembly of claim 1, further comprising a stop member configured to abut the lock portion so as to limit a movement of the lock member.

12. The cross-link assembly of claim 1, wherein the pin is connected to an autoconnect bracket, the autoconnect bracket being rotatable with the pin about the pin rotational axis.

13. The cross-link assembly of claim 2, wherein the lock member is a rod and the abutment follower and the lock portion are disposed on opposite ends of the rod.

14. The cross-link assembly of claim 5, wherein the holder includes a pair of legs separated by a central void, and the roller is disposed in the central void.

15. The cross-link assembly of claim 11, wherein the stop member is a plate having an aperture, and
the lock member is translatably disposed through the aperture.

16. A method for maintaining alignment of a cross-link assembly and a dangling worktool, the cross-link assembly including
a frame having spaced apart arms,
a pin engaged with the spaced apart arms and being rotatable relative to the spaced apart arms about a pin rotational axis, the pin having an abutment portion, and
a lock member movably engaged with the frame, the lock member having a first portion that is in contact with the abutment portion, and having a lock portion that is configured to engage with a lock element provided on a grapple,
the method comprising:
aligning a longitudinal axis of the frame and a longitudinal axis of a grapple head assembly connected to the grapple; and
varying a distance from the first portion of the lock member to the pin rotational axis by rotating the pin relative to the spaced apart arms about the pin rotational axis.

17. The method of claim 16, further comprising engaging the lock portion with the lock element, the lock element including a slot and a pair of bosses for receiving the lock portion.

18. The method of claim 16, further comprising engaging an indentation of the lock portion with a boss of the lock element.

19. The method of claim 16, further comprising rotating an autoconnect bracket connected to the pin.

20. The method of claim 16, further comprising biasingly engaging the lock member with the frame such that an abutment follower of the lock member is biased toward the pin.

* * * * *